N. G. LONG.
VEHICLE WHEEL.
APPLICATION FILED SEPT. 9, 1907.

911,826.

Patented Feb. 9, 1909.
2 SHEETS—SHEET 1.

Witnesses
Phil E. Barnes
C. Bradway

Inventor
Nathaniel G. Long.

By Victor J. Evans
Attorney

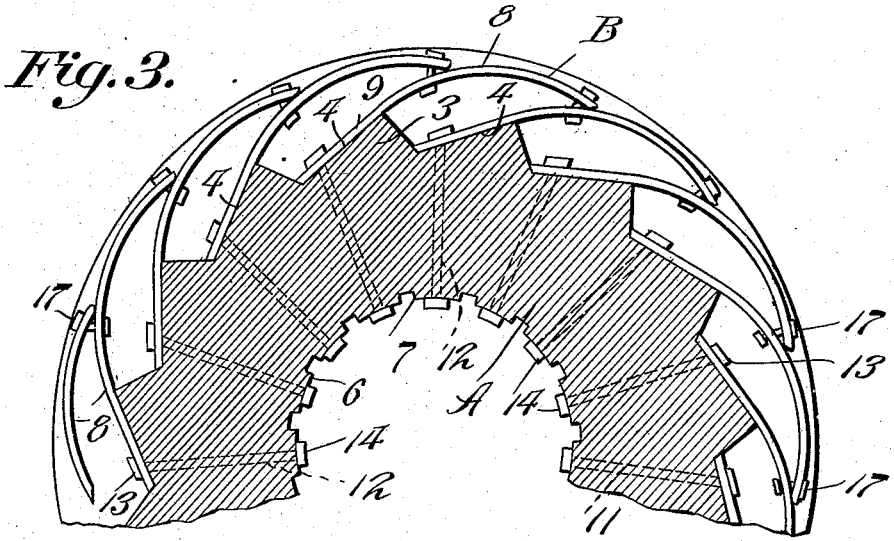
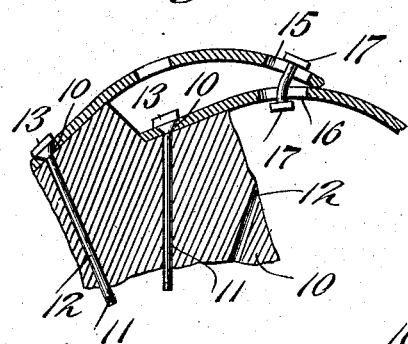
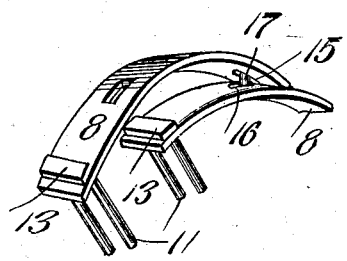
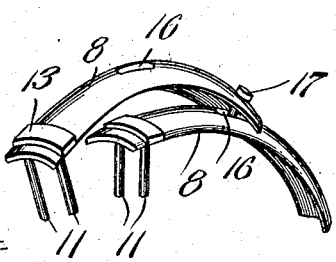

UNITED STATES PATENT OFFICE.

NATHANIEL G. LONG, OF ELBERTON, GEORGIA.

VEHICLE-WHEEL.

No. 911,826.      Specification of Letters Patent.      Patented Feb. 9, 1909.

Application filed September 9, 1907. Serial No. 391,998.

*To all whom it may concern:*

Be it known that I, NATHANIEL G. LONG, a citizen of the United States of America, residing at Elberton, in the county of Elbert and State of Georgia, have invented new and useful Improvements in Vehicle-Wheels, of which the following is a specification.

This invention relates to wheels designed for use on self-propelling vehicles, horse-drawn vehicles of various types, locomotives, bicycles, and the like, and relates more particularly to wheels of that class in which springs are employed for absorbing the shocks incident to the vehicle passing over obstructions and inequalities in the surface of the road, street, track or the like.

The invention has for one of its objects to improve and simplify the construction of devices of the character referred to so as to be comparatively easy and inexpensive to manufacture, composed of few parts, and highly efficient and reliable in use.

A further object of the invention is the provision of a wheel provided with a novel arrangement of yielding members that cushion the shocks imparted to the wheel.

A further object is to provide a wheel having a circumferential groove in which are arranged overlapping yielding members or springs which operate to insure smooth running of the vehicle and to prevent the transmission of shocks and jolts to the body of the vehicle.

A still further object resides in the features of construction of the nature referred to, in connection with a solid rubber tire encircling the yielding members for increasing the resiliency or cushioning effect of the wheels.

With these objects in view and others, as will appear as the description proceeds, the invention comprises the various novel features of construction and arrangement of parts which will be more fully described hereinafter and set forth with particularity in the claims appended hereto.

Figure 1:
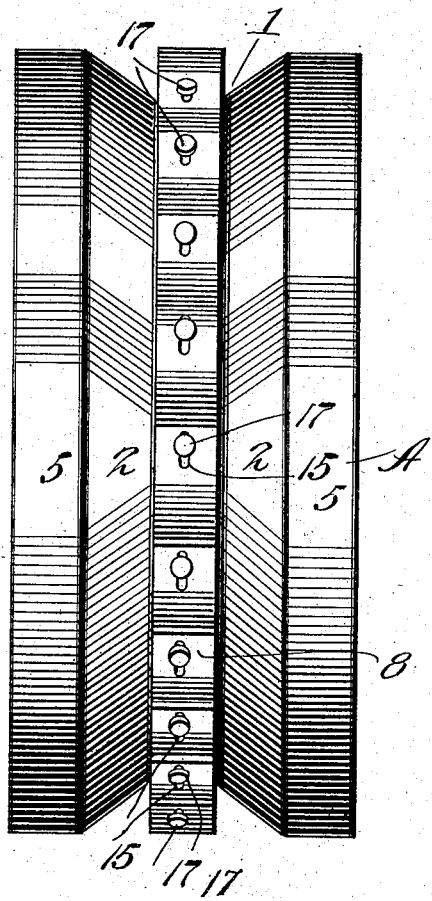
Figure 2:
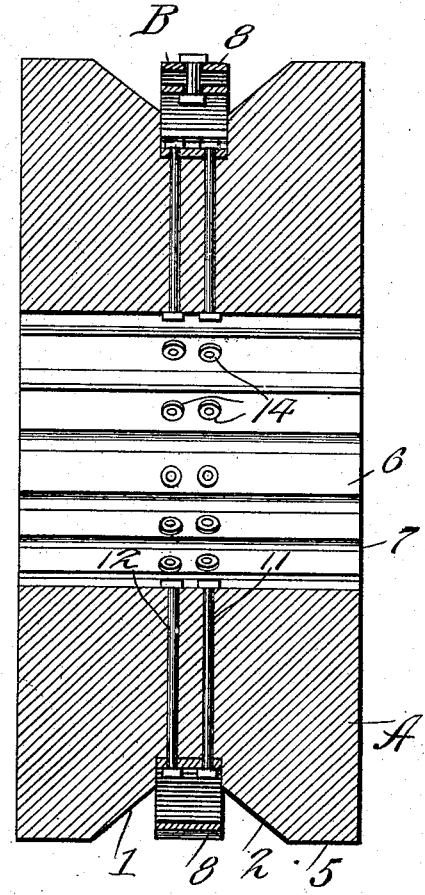
Figure 7:
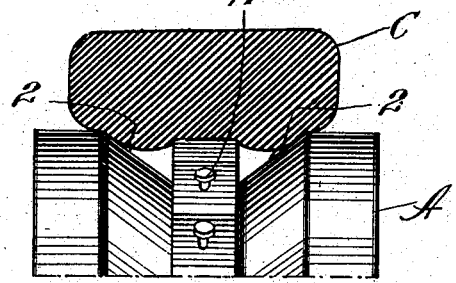
Figure 8:
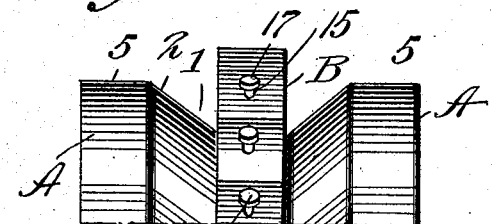

In the accompanying drawings, which illustrate one of the embodiments of the invention, Figure 1 is an edge view of the wheel. Fig. 2 is a central section taken parallel with the axis of the wheel. Fig. 3 is a partial central section taken transversely to the axis of the wheel. Fig. 4 is a fragmentary sectional view showing two adjacent yielding members. Fig. 5 is a detail perspective view of two adjacent yielding members. Fig. 6 is a similar view of a modified form. Fig. 7 is a detail view showing the adaptation of a rubber tire to the wheel. Fig. 8 is a similar view showing the springs or yielding members protruding beyond the peripheral surface of the felly of the wheel. Figs. 9 and 10 are fragmentary perspective views of modified forms of tread members or cushioning devices for permitting one member to slide upon another and preventing relative lateral movement.

Similar reference characters are employed to designate corresponding parts in the several views.

Referring to the drawings, A designates the body of the wheel which may be of annular form, as shown, and of any desired shape and size, and constructed of any suitable material. In the periphery of the wheel is a central groove 1 that has sloping sides 2 and a bottom 3 that is formed with steps or serrations 3 that have approximately tangential faces 4. The cylindrical portions 5 of the wheel body A provide substantial bearing faces at the felly of the wheel. The center of the body A is provided with an opening 6 for receiving a hub of any approved construction and this opening may be provided with longitudinally extending grooves 7 for receiving correspondingly shaped tongues on the hub, whereby the body and hub will be locked together for rotation.

Disposed within the groove 1 are cushioning devices extending entirely around the wheel and designated generally by B. In the present instance, these devices comprise pieces of comparatively stiff spring metal such as steel and of band stock. Each piece or member 8 has a flat portion 9 presented to one of the surfaces 4 in the bottom of the groove 1, and on the outer end of such surface, the member 8 is curved and lies in proximity to the periphery of the wheel, the convex side being disposed outermost. The members 8 are arranged in overlapping relation and the free end of any one terminates adjacent the middle of the next member underlying the same so that the juxtaposed members are arranged in contact and the pressure on one is distributed to the adjacent ones. In this manner, no spring is subjected alone to the entire weight sustained by the wheel, and the pressure is distributed to a plurality of springs. The inner ends of the members 8 are provided with apertures 10, as shown in Fig. 4, for the reception of bolts 11 that pass through radially extending passages 12 in the body A, whereby the springs are firmly held against the flat surfaces 4. Each pair of bolts for the members 8 are connected together by a head-piece 13 that bears on the top side of the respective member 8, and on the inner ends of the bolts are nuts 14 that screw down tightly against the internal surface of the opening 6 in the body A. The free ends of the members 8 may be, and preferably are, tied to the intermediate portion of each adjacent underlying member, and for this purpose, the extremities are provided with longitudinal slots 15, and a slot 16 is provided at an intermediate point and the terminal and intermediate slots of two adjacent members are adapted to register, and disposed in the slots are bolts 17 for slidably and flexibly connecting the members together. The yielding members 8 may be of flat cross section, as shown in Fig. 5, or of curved cross section, as shown in Fig. 6.

A wheel of the construction described lends itself for use with or without a rubber tire. When a rubber tire is employed, the yielding members 8 are so designed as to lie below the periphery of the body A, so that the inclined surfaces 2 of the groove 1 will serve to maintain the rubber tire in position on the wheels, as shown by dotted lines at C, Fig. 7. In this construction, the resiliency of the tire and of the members 8 coöperate to produce a smooth running wheel and one which will successfully absorb shocks. When the wheel is not shod with the rubber tire, the members 8 are so designed as to project beyond the periphery of the body A, as shown in Fig. 8 so as to provide sufficient play or yielding movement of the members 8 without the felly of the wheel coming in contact with the road.

It may be desirable in some instances to dispense with the bolts for securing adjacent tread members or cushioning devices together, and for this purpose the free extremities of members B may be formed each with a tongue 20 that is adapted to slide back and forth in a depression or groove 21 in the outer surface of the adjacent nether member. This permits the members to slide back and forth on each other and as designed at the same time prevents relative lateral movement. According to the construction shown in Fig. 10 the free extremities of the members B are provided with clips that slidably engage over the middle portions of the adjacent members, these clips being formed in the present instance by ears 22 bent to engage the edges of the members B, as shown in Fig. 10.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims.

Having thus described the invention, what I claim is:—

1. In a wheel, the combination of an annular body having a V-shaped groove, a plurality of springs rigidly secured at their ends to the bottom of the groove, and means for slidably connecting the free ends of each spring to the intermediate portion of the adjacent spring, with a rubber tire extending around the body and bearing directly on the springs and entering the groove at opposite sides of the springs.

2. The combination of a body having an annular groove, a plurality of springs arranged in overlapping relation and having terminal and intermediate slots, means for securing the inner ends of the members in the groove, and fastenings passing through the slots for yieldingly connecting the extremity of each spring to the intermediate portion of the adjacent spring.

3. In a wheel, the combination of an annular body provided with a peripheral groove, passages extending from the bottom of the groove to the hub opening, a plurality of yielding members having bolt-receiving apertures at one end and longitudinal slots at the outer ends and at intermediate points, bolts passing through the apertures and said passages for securing the members to the body, the outer extremity of each member being arranged over an intermediate portion of the juxtaposed member for bringing the intermediate and terminal slots into register, fastenings extending through the registering slots of adjacent members, and means for attaching the body to a hub.

4. In a wheel, the combination of an annular body, having a peripheral groove formed with oppositely inclined walls, resilient members secured in the periphery thereof and extending in the same general direction and having their outer extremities spaced from the said inclined walls, the extremities of each member terminating at a point intermediate the end of the adjacent under member and adapted to slidably bear thereon, and means for preventing relative lateral movement of the free ends of the members, and a tire encircling the body and entirely covering the groove, said tire bearing directly on the said members and entering the groove at opposite sides of the members.

In testimony whereof I affix my signature in presence of two witnesses.

NATHANIEL G. LONG.

Witnesses:
F. S. MITCHELL,
S. L. DALLAS.